United States Patent [19]

Udipi

[11] 4,255,536

[45] Mar. 10, 1981

[54] AZODICARBOXYLATE-MODIFIED COPOLYMERS

[75] Inventor: Kishore Udipi, Bartlesville, Okla.

[73] Assignee: Phillips Petroleum Company, Bartlesville, Okla.

[21] Appl. No.: 32,978

[22] Filed: Apr. 24, 1979

[51] Int. Cl.$^3$ ............................................... C08F 8/30
[52] U.S. Cl. ................................... 525/314; 525/333; 525/376
[58] Field of Search .......................... 525/376, 333, 314

[56] References Cited

U.S. PATENT DOCUMENTS 4,129,531  12/1978  Rauer et al. .......................... 525/376

OTHER PUBLICATIONS

J. Org. Chem.; "Reaction of Ethyl Azodicarboxylate with Monoolefins," vol. 29; 2226–2235 (1964).

*Primary Examiner*—William F. Hamrock

[57] ABSTRACT

A copolymer of a conjugated diene/monovinylarene modified by reaction with a dihydrocarbyl azodicarboxylate.

35 Claims, No Drawings

AZODICARBOXYLATE-MODIFIED COPOLYMERS

FIELD OF THE INVENTION

The invention pertains to azodicarboxylate-modified copolymers. In another aspect, the invention pertains to wet-skid resistant rubbers. In a still further aspect, the invention pertains to rubbery or resinous copolymers exhibiting oil-resistance (swell resistance).

BACKGROUND OF THE INVENTION

The manufacture of such as tire tread compositions includes various natural and synthetic rubbery polymers. Various blends or treatments have been proposed to improve wet-skid resistance, particularly for pneumatic tires.

Other applications of rubbery or resinous copolymers have dictated requirements for oil and fuel resistance, when the polymers are utilized for seals requiring a composition resistant to oil or fuel to avoid swelling, or utilized for containers for hydrocarbon fluids which resist swelling and consequent weakening.

Needed, however, are copolymers exhibiting improved wet-skid resistance, or oil resistance.

BRIEF SUMMARY OF THE INVENTION

This invention is directed toward novel dihydrocarbyl bicarbamate-modified copolymers of conjugated dienes and monovinylarenes. The novel modified copolymers of my invention are formed from the addition reaction of the dihydrocarbyl azodicarboxylate with a precursor copolymer to form a copolymer with pendant dihydrocarbyl bicarbamate groups. The novel bicarbamate modified copolymers of my invention exhibit good resistance toward swelling by hydrocarbon agents. Furthermore, cured rubbery compositions based on these novel bicarbamate modified copolymers exhibit improved wet-skid resistance.

DETAILED DESCRIPTION OF THE INVENTION

I have discovered that the reaction product of a dihydrocarbyl azodicarboxylate with a copolymer of at least one conjugated diene and at least one monovinylarene (characterized as having at least 5 mole percent residual olefinic unsaturation based on total moles of conjugated diene present in the copolymer) exhibits good resistance toward oil and toward swelling by hydrocarbon agents. Furthermore, the cured compositions which are rubbery based on these copolymer-dihydrocarbyl azodicarboxylate addition products further exhibit good wet-skid resistance.

PRECURSOR COPOLYMERS

The precursor copolymers suitable for reacting with the dihydrocarbyl azodicarboxylate to form the novel modified copolymers of my invention are unsaturated random and block conjugated diene monovinylarene copolymers containing at least 5 mole percent residual olefinic unsaturation. The block copolymers include those containing at least two pure homopolymer block segments (one from each type of monomer) as well as those containing one or more random or tapered block segments, and other types of such copolymers. The precursor copolymers generally will have a conjugated diene:monovinylarene weight ratio of about 5:95 to 95:5, and preferably will be rubbery of about 55:45 to 85:15. The copolymers can be prepared by methods known in the art, such as by emulsion or solution polymerization. Presently preferred are the hydrocarbyl alkali metal-initiated solution polymerization methods and resulting copolymers described, for example, in U.S. Pat. Nos. 2,975,160, 3,078,254, 3,281,383, and 3,449,306, the disclosures of which are herein incorporated by reference.

Conjugated diene monomers for the preparation of the precursor copolymers ae those containing 4 to such as 12 carbon atoms per molecule. Exemplary conjugated monomers include such as 1,3-butadiene, isoprene, 2,3-dimethyl-1,3-butadiene, piperylene, 3-butyl-1,3-octadiene, 2-phenyl-1,3-butadiene, and the like, and mixtures thereof. Especially preferred is 1,3-butadiene due to its availability and favorable cost.

Monovinylarene monomers suitable for the preparation of the precursor copolymers contain 8 to such as 20 carbon atoms per molecule, and include those which further contain alkyl, cycloalkyl, and aryl substituents, and combinations thereof such as alkylaryl, in which the total number of carbon atoms in the combined substituents generally is not greater than 12. Exemplary monovinylarene monomers include such as styrene, alpha-methylstyrene, 3-methylstyrene, 4-n-propylstyrene, 4-cyclohexylstyrene, 4-dodecylstyrene, 2-ethyl-4-benzylstyrene, 4-p-tolystyrene, 4-(4-phenyl-n-butyl)styrene, 1-vinylnaphthalene, 2-vinylnaphthalene, and the like, and mixtures. Styrene presently is preferred due to its availability and effectiveness.

Solvents for use in solution polymerization of such monomers include paraffinic, cycloparaffinic, and aromatic hydrocarbons, and mixtures thereof. Exemplary solvents include n-pentane, n-hexane, n-heptane, 2,2,4-trimethylpentane, cyclohexane, benzene, toluene, xylene, and the like alone, or in admixture. Optionally, a mixture of a hydrocarbon solvent with a polar solvent can be employed if it is desired to enhance the formation of a particular polymer structure, i.e. high vinyl content or formation of random copolymer, or to improve the efficiency of the polymerization process. Such a polar solvent of course should be such as does not adversely interact with the initiator, monomers, coupling agents if employed, or other ingredients of the polymerization recipe. Useful polar solvents include such as cyclic and acyclic ethers, thioethers, tertiary amines, and other such polar solvents used for this purpose as known in the art, frequently and typically tetrahydrofuran.

Initiators suitable for preparation of solution polymerized precursor copolymers include any of the organoalkali metal initiators known for anionic solution polymerization of the monomers described. These initiators include the organolithium compounds of the general formula $R(Li)_x$, in which R is an aliphatic, cycloaliphatic, aromatic, or combination hydrocarbyl radical. R has a valence equal to the integer x and generally contains 1 to 20 carbon atoms, although higher molecular weight compounds can be utilized, and x is an integer of 1 to 10, inclusive, preferably 1 to 4 due to availability. n-Butyllithium is an example of an especially suitable polymerization initiator due to its ready availability and activity.

Other suitable organolithium initiation agents include the alphalithio multisubstituted dialkylbenzenes and corresponding oligomers. Although these initiators normally consist of a mixture of various oligomers, the mixture primarily is 1,3-bis(1-lithio-3-methylpentyl)benzene, and this initiator typically is referred to as DiLi-3. Additional information regarding such compounds is in U.S. Pat. No. 3,668,283 to Morrison et al (1972) and U.S. Pat. No. 3,776,964 to Morrison et al (1973).

The amount of organolithium initiator to be used can vary widely, primarily depending on the desired molecular weight of the polymer, but generally is in the range of about 0.1 to 100 milliequivalents of lithium per 100 grams of total monomer, so long as the desired molecular weight for the precursor copolymer is achieved either as the result of polymerization alone, or the result of polymerization plus optional subsequent coupling.

The analogous sodium and potassium compounds also are suitable as initiators for preparation of the precursor copolymers for use according to my invention.

Polymerization conditions generally known to one skilled in the art can be employed. The polymerization temperatures can vary over a broad range, generally such as about −50° C. to 200° C. It is presently considered preferable to operate within a temperature range of about 50° to 150° C. for convenience. Pressures employed can be as convenient, usually sufficient to maintain monomers/solvent substantially in a liquid phase.

Termination to remove active lithium, of course, is necessary, otherwise later treatment with azodicarboxylate might result in coupling rather than the desired modification. Termination of the solution polymerization can be by means known in the art. The copolymerization can be terminated by treatment with water, lower alcohols, or the like; or preceded by methods which tend to couple two or more polymer-alkali metal moieties to form linear or branched copolymers, followed, if necessary, by treatment by water or lower alcohol. The copolymer can be recovered by coagulation, steam-stripping, and the like.

Optionally, and conveniently, the terminated precursor copolymer need not be recovered from its solution in polymerization solvent, but can be treated as such with a dihydrocarbyl azodicarboxylate in accordance with my invention.

The precursor copolymers suitable for use in my invention generally will have a number average molecular weight of at least about 5,000, preferably about 5,000 to 1,500,000, more preferably from 40,000 to 250,000 because of ease of preparation, and ease of processability in subsequent compounding and fabrication steps. It should be recognized that for those copolymers predominating in monovinylarene that the low molecular weight copolymers are suitable, but that for polymers predominating in conjugated diene, that a somewhat higher minimum molecular weight material is necessary.

The precursor copolymers suitable for use in my invention can be unhydrogenated, or partially hydrogenated. However, it is necessary that the partially hydrogenated copolymers contain at least 5 mole percent residual olefinic unsaturation. This unsaturation is required for reaction with the dihydrocarbyl azodicarboxylate so as to give the novel modified copolymers of my invention. The substantially hydrogenated precursor polymers are preferred for modification according to my invention where the added benefit of ozone resistance is desired. Hydrogenation of the precursor itself also further improves oil resistance of the subsequently prepared bicarbamate modified copolymers. Where partially hydrogenated polymers are employed, hydrogenation can be accomplished using hydrogenation techniques known to one skilled in the art, including hydrogenation of unterminated copolymer in solution in polymerization solvent.

DIHYDROCARBYL AZODICARBOXYLATE MODIFICATION

The dihydrocarbyl azodicarboxylates suitable for use in my invention can be represented by the general structural formula:

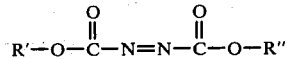

in which R' and R" are alkyl, cycloalkyl, aryl, or combination radicals and can be the same or different. Typically R' and R" each contain 1 to such as 12 carbon atoms. Presently preferred are the dialkyl azodicarboxylates. Diethyl azodicarboxylate and di-t-butyl azodicarboxylate are examples of suitable available dialkyl azodicarboxylates for use in my invention. Other exemplary azodicarboxylates include such as similar azodicarboxylates wherein R and R" can be selected from various of such as methyl, dodecyl, cyclohexyl, phenyl, and combinations.

The reaction between the dihydrocarbyl azodicarboxylate and the precursor conjugated diene/-monovinylarene copolymer of at least 5 mole percent residual olefinic unsaturation can be conducted using any method wherein these two materials are brought into contact under conditions suitable for reaction. In preparing the copolymers of my invention, a solution method employing an inert hydrocarbon solvent which is a solvent for both the dihydrocarbyl azodicarboxylate and the copolymer is most advantageously employed for convenience.

The solvent employed for the reaction between the dihydrocarbyl azodicarboxylate and the precursor copolymer should be inert to the dihydrocarbyl azodicarboxylate, the precursor copolymer, and the resulting novel modified copolymer of my invention. Suitable solvents are the hydrocarbon solvents described hereinabove for the preparation of the precursor copolymer, with the stipulation that the two reactants be sufficiently soluble in the chosen solvent to give a substantially homogeneous solution. A mixture of solvents optionally can be used to effect suitable solubility of the two reactants.

The precursor copolymer and the dihydrocarbyl azodicarboxylate can be dissolved in a single suitable hydrocarbon solvent or solvents, or optionally each can be separately dissolved in a different solvent which is a preferred solvent for that specific reactant, and the two different solutions then added together to give a substantially homogeneous reaction mixture. Alternatively, the dihydrocarbyl azodicarboxylate can be dissolved in a solvent and this solution added to the precursor polymer cement (copolymer polymerization mixture) resulting from termination of the polymerization reaction. The solvent chosen for dissolving the dihydrocarbyl azodicarboxylate can be the same as or different from the polymerization solvent.

The concentration and ratio of the individual reactants in the reaction mixture can vary over a wide range depending on individual and relative solubilities, and on the desired level of modification of the precursor copolymer, i.e. the number of dihydrocarbyl bicarbamate pendant groups attached to the polymer backbone. Typically the precursor copolymer is used as about a 10 to 20 weight percent solution in the chosen solvent, and the dihydrocarbyl azodicarboxylate conveniently is added at a level corresponding to about 50 to 500 millimoles per 100 grams of precursor copolymer. Higher levels, however, can be employed, if desired, for production of modified copolymers for special applications.

The addition reaction between the dihydrocarbyl azodicarboxylate and the precursor copolymer can occur under the influence of ultraviolet irradiation, or at moderately elevated temperatures preferably not over about 150° C., due to possible decomposition of the dihydrocarbyl azodicarboxylate, though this may be affected by the solvent employed. Care must be taken not to exceed the decomposition temperature of the dihydrocarbyl azodicarboxylate since decomposition would result in a modified copolymer having less than the desired number of hydrocarbyl bicarbamate pendant groups. The decomposition temperature varies with the solvent employed as well as being influenced by the presence of other materials, residues, and impurities. Decomposition of dihydrocarbyl azodicarboxylate does not occur to an appreciable extent in the reactions described if the temperature is maintained at about 150° C. or lower.

The length of time which the reaction mixture is maintained depends on the temperature chosen, but generally will range from about 0.1 hours to several days, more preferably from about 0.5 hours to 24 hours. The progress of the reaction can be followed visually by the disappearance of the yellow color of the dihydrocarbyl azodicarboxylate in the reaction mixture.

The reaction can be conducted at pressures ranging from atmospheric to several atmospheres, the addition reaction being enhanced by higher pressures. The reaction normally is conducted under an inert atmosphere such as nitrogen to minimize possibilities of thermal oxidation of the copolymer.

COMPOUNDING ADDITIVES

My bicarbamate modified copolymers can be compounded with various additives.

Exemplary of the additives that can be mixed with a modified polymer are calcium carbonate, carbon blacks, silica, calcium silicate, alumina, various dyes and pigments, non-reinforcing as well as reinforcing fillers, and various types of stabilizing materials known in the art.

The novel modified copolymers of my invention are suitable for such uses as hoses, belts, shoe soles, tires, gaskets, and various molded or extruded articles.

The modified copolymers, particularly the rubbers, with such fillers, extenders, plasticizers, reinforcing agents, as may be desired or indicated by usage, ultimately can be cured or crosslinked. The curing system can be either a sulfur-system or a peroxy-system. Presently preferred for low-odor and economy is the sulfur curing system. The sulfur-cure system comprises sulfur or sulfur-containing compounds such as organic sulfides, organic sulfenamides, and the like, as well as various combinations, as is known in the curing arts. Generally, the quantity of sulfur in the free or combined form employed will be in the range of about 0.1 to 5 weight percent based on the rubbery portion of the composition.

Peroxy-based curing systems known in the art to be useful in crosslinking rubbers alternatively can be employed, but presently are considered less desirable in this invention due to their relatively high cost and to the sometimes less agreeable odor imparted to the vulcanized stocks by the peroxy systems.

Various primary and secondary accelerators, typified by benzothiazyldisulfide or mercaptobenzothiazole or benzothiazyl-2-sulfenomorpholide, can be incorporated. Sensitivity of the vulcanizing system employed to heat, known as the scorch time, will dictate the incorporation method to be used. Generally, any type of commercial blending, Banbury mixer, and the like, can be employed.

A general recipe for tire tread stock, which tread stocks constitute a particularly desirable aspect of my invention, can include as exemplary constituents and amounts as follows:

| Constituent | Tire Tread Stock Broad, parts by weight | Preferred, parts by weight |
| --- | --- | --- |
| Polymer | 100 | 100 |
| Carbon Black | 40–120 | 50–90 |
| Extender Oil | 5–80 | 8–50 |
| Sulfur | 1–3 | f |
| Activator(a) | 1–8 | f |
| Accelerator(b) | 0.5–1.5 | f |
| Secondary accelerator(c) | 0–0.5 | f |
| Antioxidant & antioxonant(d) | 1–3 | |
| Processing aids(e) | 0–5 | |

(a)Zinc oxide, stearic acid, zinc stearate and mixtures thereof are commonly used.
(b)2-mercaptobenzothiazole, N-cyclohexyl-2-benzothiazoyl sulfenamide are commonly used.
(c)Diphenylguanidine, tetramethylthiuram disulfide are commonly used.
(d)Amines such as phenyl-S-naphthylamine, diarylamineketone reaction product, N,N'-diphenyl-p-phenylenediamine, etc., alkylated phenols, such as butylated hydroxytoluene, etc; phosphites, such as tris(nonylphenyl)phosphite, etc., are commonly used.
(e)Waxes commonly are used.
(f)Preferable amounts of sulfur, accelerator and secondary accelerator are interrelated, depending also on desired properties of vulcanizate.

EXAMPLES

Examples provided are designed to assist in an understanding of my invention, and are not intended to be limitative relative to particular components, relationships, and the amounts, and the like, all of which should be considered in their proper context as exemplary of the scope of my invention.

EXAMPLE I

This example demonostrates the preparation and evaluation of a bicarbamate-modified linear butadiene-styrene teleblock copolymer resulting from the addition reaction of diethyl azodicarboxylate with a typical linear butadiene-styrene teleblock copolymer.

A 60/40 weight ratio butadiene/styrene linear teleblock rubbery copolymer having the general structure 20-60-20 polystyrene-polybutadiene-polystyrene and having a weight average and a number average molecular weight of 79,000 and 76,000, respectively, was prepared by typical sequential addition using solution polymerization methods with an organomonolithium as initiator.

One hundred grams of this precursor copolymer and 1000 ml. xylene were placed in a 2 liter, two-necked round bottom flask equipped with a water-cooled reflux condenser and a nitrogen inlet. The mixture was stirred using a magnetic stirrer until all of the copolymer was dissolved. Twenty-one grams of diethyl azodicarboxylate were added to the copolymer-xylene solution at room temperature with continued stirring, the solution thoroughly purged with nitrogen to remove oxygen from the solution and the reaction flask, and the temperature of the solution then slowly raised to 120° C. using a heating mantle. The solution was maintained at this temperature for 16 hours with continued stirring and under a slow nitrogen flow so as to maintain inert conditions. The yellow color of the solution imparted by the yellow diethyl azodicarboxylate slowly disappeared during the first hour of the heating period leaving a clear solution.

The solution was allowed to cool to room temperature under continued nitrogen flow and then transferred to a 4-liter beaker. The cooled solution was stirred with an air-driven motor and 1 part of 2,6-di-t-butyl-4-methylphenol antioxidant per hundred parts of copolymer added as a 10 weight percent solution in 1:1 toluene:isopropanol. Excess isopropyl alcohol (about 2 liters) then was added slowly so as to coagulate the modified copolymer. The modified copolymer was collected by filtration and dried overnight under reduced pressure at 50° C.

Analysis of a sample of the dried bicarbamate-modified copolymer for nitrogen content (Kjeldahl method) showed the presence of 3.27 weight percent nitrogen (2.79 weight percent theoretical nitrogen based on quantity of starting materials employed). Activation analysis of this modified copolymer indicated the presence of 30.35 weight percent oxygen (6.39 weight percent theoretical oxygen based on quantity of starting materials employed). In view of this unexpectedly high value, a sample of the modified copolymer was dissolved in toluene and recoagulated with n-pentane. The copolymer was recovered by filtration, dried under reduced pressure at 50° C., and resubmitted for oxygen analysis. A value of 8.15 weight percent oxygen indicated that the previously obtained high oxygen value apparently was due to residual alcohol in the initially recovered modified copolymer. The reason for the higher-than-theoretical nitrogen and oxygen values is not known, and may lie in the accuracy of the analytical method, but may be due to nonquantitative conversion of monomer of polymer.

Properties of the starting unmodified precursor butadiene/styrene linear teleblock copolymer and of the bicarbamate-modified copolymer are shown for comparative purposes to demonostrate the improved oil resistance of the modified copolymer in Table I:

TABLE I

Physical Properties of Diethyl Azodicarboxylate Modified And Non-modified Butadiene-Styrene Linear Teleblock Copolymer

|  | Non-Modified Block Copolymer (Control) | Modified Block Copolymer |
|---|---|---|
| Melt flow, g/10 min.[a] | 3.9 | 22.2 |
| 200% Modulus (25° C.), MPa[b] | 3.8 | 2.4 |
| Tensile strength (25° C.), MPa[b] | 29.6 | 29.6 |
| Elongation (25° C.), %[b] | 690 | 670 |
| Hardness, Shore A[c] | 92 | 82 |
| Oil Resistance[d] | | |
| Aged 7 Days in ASTM Oil #3 at room temperature | | |
| Tensile strength (25° C.), MPa | Dissolved | 2.5 |
| Elongation (25° C.), % | Dissolved | 925 |
| % Swell After 7 Days in Oil at room temperature | | |
| ASTM Oil #1 | 10.5 | 4.6 |
| ASTM Oil #2 | 19.7 | 9.2 |
| ASTM Oil #3 | 197.3 | 52.2 |
| Reference Fuel A | 177.2 | 52.6 |
| Reference Fuel B | Dissolved | Dissolved |

[a]ASTM D1238-73, Condition G modified by using temperature of 180° C. instead of 200° C.
[b]ASTM D412-75
[c]ASTM D2240-75
[d]ASTM D471-75

These data demonostrate that the dihydrocarbyl azodicarboxylate-modified copolymer has significantly better oil resistance that the non-modified precursor, while yet maintaining the good tensile strength of the precursor unmodified copolymer. The apparent sharply higher melt flow for the modified copolymer is an anomaly not understood in view of the close similarity of the tensile strength and elongation for both the modified and non-modified copolymers.

EXAMPLE II

This example demonstrates the preparation and evaluation of a bicarbamate-modified random butadiene/styrene copolymer.

A 75/25 butadiene/styrene random radical copolymer having nominal weight average and number average molecular weights of 380,000 and 180,000 respectively, was prepared by organomonolithium initiated solution polymerization employing n-butyllithium in the presence of tetrahydrofuran as the polar randomizing agent followed by termination with silicon tetrachloride as the multifunctional branching agent.

One hundred grams of this polymer and 21 g of diethyl azodicarboxylate were reacted according to the procedure described in Example I. The bicarbamate-modified random copolymer was recovered and purified by recoagulation as described in Example I. The modified copolymer was found by analysis to contain 3.06 weight percent nitrogen (2.79 weight percent theoretical) and 7.98 weight percent oxygen (6.39 weight percent theoretical). Comparison of the properties of the modified and non-modified random copolymers are shown in Table II:

TABLE II

Comparison of Properties of Modified and Non-modified Random Copolymers

|  | Non-modified Random Copolymer (Control) | Modified Random Copolymer |
|---|---|---|
| Inherent viscosity[a] | 1.75 | 1.31 |
| Molecular weight, $M_w$[b] | 378,000 | 264,000 |
| Molecular weight, $M_n$[b] | 221,000 | 200,000 |
| Gel, % by weight | 0 | 0 |
| Raw Mooney[c] | 56 | 59 |

[a]Inherent viscosity was determined according to the procedure given in U.S. Patent 3,278,508, column 20, note a with the modification that the solution was not filtered through a sulfur absorption tube but rather a sample of the solution was filtered through a fritted glass filter stick of grade C porosity and pressured directly into the viscometer.
[b]Molecular weights were determined from gel permeation chromatography curves by a procedure described by G. Kraus and C. J. Stacy, J. Poly. Sci. A-3 10, 657 (1972), and G. Kraus and C. J. Stacy, J. Poly. Sci. Symposium No. 43, 329 (1973).
[c]Mooney viscosity, ML-4 aat 100° C., ASTM D1646-63.

The modified and non-modified random copolymers were compounded in a typical tire tread recipe according to the formulation given in Recipe 1:

| RECIPE 1 | |
|---|---|
| Ingredient | Parts by Weight |
| Modified or non-modified copolymer | 100 |
| Carbon black[a] | 50 |
| Philrich® 5[b] | 10 |
| Zinc Oxide | 3 |
| Stearic Acid | 2 |
| Flexamine G[c] | 1 |
| Sulfur | 1.75 |
| Santocure NS[d] | 0.9 |

[a]N330 type; Industry reference black No. 4
[b]A highly aromatic extender oil from Phillips Petroleum Company.
[c]An antioxidant and cure activator consisting of 65 percent of a complex diarylamine-ketone reaction product and 35 percent of commercial N,N'-diphenyl-p-phenylenediamine from Uniroyal Chemical.
[d]A cure accelerator having the structure N-t-butyl-2-benzothiazolesulfenamide from Monsanto.

Compounding was conducted in a Brabender Plasti-Corder equipped with a Banbury head operated at 120 rpm, and with the jacketed mixing cavity heated externally with circulating fluid maintained at 60° C. The copolymer was charged initially and masticated for 0.5 minutes before one-half of the black and one-half of the chemicals were added. One minute later the balance of the black and the chemicals was added, and then 0.5 minute later the extender oil was added. The stock was dumped when the temperature reached 155° C. Additional mixing was conducted using a 2-inch roll mill operated at 80 rpm and at a temperature of 35°–40° C. The compounded stock was sheeted off and then remilled two additional times at the same conditions. The compounded stock was cured at 150° C. for 45 minutes. Properties of the compounded raw stock and the compounded vulcanized stock are shown in Table III:

TABLE III

Properties of Compounded and Vulcanized Tread Stocks Based on Diethyl Azodicarboxylate Modified and Non-modified Butadiene/Styrene Random Radial Copolymers

| | Non-modified Random Copolymer (Control) | Modified Random Copolymer |
|---|---|---|
| Compounded Raw Stock | | |
| Compounded Mooney[a] | 67.5 | 74 |
| Scorch time, minutes[b] | 15.8 | 11.4 |
| Cure rate index[b] | 6.8 | 9.3 |
| 90% cure, minutes[b] | 30.6 | 22.1 |
| uz,1/16 Compounded Vulcanized Stock | | |
| 200% Modulus (25° C.), MPa[c] | 4.8 | 6.7 |
| Tensile strength, (25° C.), MPa[c] | 25.1 | 23.0 |
| Elongation (25° C.), %[c] | 560 | 460 |
| Hardness, Shore A[d] | 66 | 71 |
| PST Values[e] | | |
| actual | 17 | 21.6 |
| relative | 100 | 127 |

[a]Mooney viscosity, ML-4 at 100° C., ASTM D1646-63.
[b]Determined using Monsanto Oscillating-Disc Rheometer Model TM-100 at 150° C. with a test arc of ± 1 degree and on a time scale of 60 minutes; ASTM D2084-75.
[c]ASTM D412-75.
[d]ASTM D2240-75.
[e]Data from Portable Skid Resistance Tester employing wet Syenite glass as per E. M. Bevilacqua and E. P. Percapio, Science 160, 959-964 (1968). Test specimens were 3 inch × inch × 0.25 inch. The relative value reflects percentage improvement of actual values of the invention composition over the control.

These data demonstrate that vulcanized stock based on random butadiene/styrene copolymer modified with a dihydrocarbyl azodicarboxylate has markedly superior wet skid resistance compared to stock containing non-modified random copolymer. Furthermore, modification of the random copolymer in accordance with my invention results in a polymer which cures faster than the non-modified polymer.

EXAMPLE III

This example demonstrates the unsuitability of applying the dihydrocarbyl azodicarboxylate modification procedure to a poly(conjugated diene) in an attempt to improve the oil resistance or wet skid resistance of the poly(conjugated diene).

Sixty grams of polyisoprene (having weight average and number average molecular weight values of 1,151,000 and 353,000 respectively) were dissolved in 1000 ml of xylene and reacted with 12.6 g of diethyl azodicarboxylate using the procedure as described in Example I. The recovered modified polyisoprene was purified by recoagulating three times from toluene solution and then dried overnight at 60° C. under reduced pressure. The resulting dried, modified polymer was a sticky mass unsuitable for forming into test strips for oil resistance evaluation. As a crude measure of oil resistance, a small piece of the sticky bicarbamate-modified polyisoprene and a small piece of non-modified starting polyisoprene were immersed in ASTM oil #3 for 7 days at room temperature. At the end of the test period both samples were highly swollen sticky masses of material which could not be formed into test specimens for evaluation and were unsuitable for any practical application.

This example demonstrates that modification of a conjugated diene homopolymer by reaction with a dihydrocarbyl azodicarboxylate does not provide a modified polymer having improved oil resistance or a product suitable for evaluating wet skid resistance.

The disclosure, including data, has illustrated the value and effectiveness of my invention. The examples, the knowledge and background of the field of the invention and the general principles of chemistry and of other applicable sciences have formed the bases from which the broad descriptions of my invention including the ranges of conditions and the generic groups of operant components have been developed, and formed the bases for my claims here appended.

I claim:

1. A gel free modified copolymer of at least one conjugated diene and at least one monovinylarene prepared by the process which comprises:
   contacting (A) an unsaturated precursor copolymer of at least one conjugated diene and at least one monovinylarene characterized by a number average molecular weight of at least about 5,000, a residual olefinic unsaturation of at least about 5 mol percent, and about 5:95 to 95:5 weight percent copolymerized conjugated diene:monovinylarene, with (B) at least one dihydrocarbyl azodicarboxylate under reaction conditions employing amounts of dihydrocarbyl azodicarboxylate effective to improve at least one of the oil swell resistance and wet skid resistance in a cured state of said precursor copolymer.

2. The copolymer according to claim 1 wherein said precursor copolymer is a partially hydrogenated copolymer.

3. The copolymer according to claim 1 wherein said weight ratio is in the range of about 55:45 to 85:15.

4. The copolymer according to claim 3 wherein said conjugated diene incorporated in said precursor copolymer is a conjugated diene of 4 to 12 carbon atoms per molecule, and wherein said monovinylarene monomer is a hydrocarbon monomer containing 8 to 20 carbon atoms per molecule.

5. The copolymer according to claim 4 wherein said conjugated diene is selected from the group consisting of 1,3-butadiene, isoprene, 2,3-dimethyl-1,3-butadiene, piperylene, 3-butyl-1,3-octadiene, 2-phenyl-1,3-butadiene, or mixture; and wherein said monovinylarene monomer incorporated into said precursor copolymer is selected from the group consisting of styrene, alpha-methylstyrene, 3-methylstyrene, 4-n-propylstyrene, 4-cyclohexylstyrene, 4-dodecylstyrene, 2-ethyl-4-benzylstyrene, 4-p-tolylstyrene, 4-(4-phenyl-n-butyl)styrene, 1-vinylnaphthalene, 2-vinylnaphthalene, or mixture.

6. The copolymer according to claim 5 wherein said dihydrocarbyl azodicarboxylate is represented by:

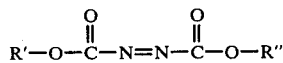

wherein R' and R" each are selected from alkyl, cycloalkyl, aryl, or combination hydrocarbon radicals, such that each of said R' and R" contains 1 to 12 carbon atoms per radical, and employing about 50 to 500 millimoles per 100 grams of precursor copolymer.

7. The copolymer according to claim 6 wherein said dihydrocarbyl azodicarboxylates are dialkyl azodicarboxylates.

8. The copolymer according to claim 7 wherein said conjugated diene is selected from isoprene and 1,3-butadiene, and said monovinylarene is styrene.

9. The copolymer according to claim 8 wherein said dihydrocarbyl azodicarboxylates are selected from the group consisting of: di-t-butyl azodicarboxylate and diethyl azodicarboxylate.

10. The copolymer according to claim 9 wherein said dihydrocarbyl azodicarboxylate is diethyl azodicarboxylate; and said precursor copolymer is a butadiene/styrene copolymer.

11. The copolymer according to claim 10 wherein said precursor copolymer exhibits a number average molecular weight of 5,000 to 1,500,000.

12. The copolymer according to claim 10 wherein said precursor copolymer exhibits a number average molecular weight of about 40,000 to 250,000.

13. The copolymer according to claim 12 wherein said precursor copolymer is a random butadiene/styrene copolymer.

14. The copolymer according to claim 13 wherein said butadiene/styrene random copolymer is a 75/25 butadiene/styrene random radial copolymer.

15. The copolymer according to claim 12 wherein said precursor copolymer is linear butadiene/styrene teleblock rubbery copolymer of about a 60:40 butadiene/styrene ratio.

16. The copolymer according to claim 2 wherein said modified copolymer is incorporated into a tire tread composition, said tire tread composition is cured, and said cured tire tread composition exhibits wet skid resistance.

17. A gel free dihydrocarbyl azodicarboxylate-modified rubbery copolymer of at least one conjugated diene and at least one monovinylarene, characterized as an unmodified copolymer prior to modification by a number average molecular weight of at least about 40,000, a residual olefinic unsaturation of at least 5 mol percent prior to dihydrocarbyl azodicarboxylate modification, and about 5:95 to 95:5 weight percent copolymerized conjugated diene: monovinylarene, and wherein said dihydrocarbyl azodicarboxylate-modified copolymer represents the reaction product of said unmodified copolymer with said dihydrocarbyl azodicarboxylate employing about 50 to 500 millimoles of dihydrocarbyl azodicarboxylate per 100 grams of unmodified copolymer.

18. The copolymer according to claim 17 wherein said weight ratio is in the range of about 55:45 to 85:15.

19. The copolymer according to claim 18 wherein said conjugated diene is selected from the group consisting of 1,3-butadiene, isoprene, 2,3-dimethyl-1,3-butadiene, piperylene, 3-butyl-1,3-octadiene, 2-phenyl-1,3-butadiene, or mixture; wherein said monovinylarene monomer incorporated into said precursor copolymer is selected from the group consisting of styrene, alpha-methylstyrene, 3-methylstyrene, 4-n-propylstyrene, 4-cyclohexylstyrene, 4-dodecylstyrene, 2-ethyl-4-benzylstyrene, 4-p-tolylstyrene, 4-(4-phenyl-n-butyl)styrene, 1-vinylnaphthalene, 2-vinylnaphthalene, or mixture; and wherein said dihydrocarbyl azodicarboxylate is represented by:

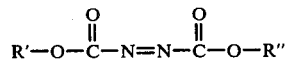

wherein R' and R" each are selected from alkyl, cycloalkyl, aryl, or combination hydrocarbon radicals, such that each of R' and R" contains 1 to 12 carbon atoms per molecule.

20. The copolymer according to claim 19 wherein said conjugated diene is selected from isoprene and the butadiene, and said monovinylarene is styrene; and wherein said dihydrocarbyl azodicarboxylate is diethyl azodicarboxylate.

21. The copolymer according to claim 20 wherein said copolymer exhibits a number average molecular weight of about 40,000 to 250,000; and wherein said copolymer is a random butadiene/styrene copolymer, a 75/25 butadiene/styrene random radial copolymer, or a linear butadiene/styrene teleblock copolymer of about a 60:40 butadiene/styrene ratio.

22. A tire incorporating the modified copolymer of claim 17 wherein said modified copolymer is incorporated into at least the tire tread composition thereof, wherein said tire tread composition is cured, and said cured tire tread composition exhibits wet skid resistance.

23. A tire incorporating the modified copolymer of claim 21 wherein said modified copolymer is incorporated into at least the tire tread composition thereof, wherein said tire tread composition is cured, and said cured tire tread composition exhibits wet skid resistance.

24. A cured dihydrocarbyl azodicarboxylate-modified polymer, prepared by
contacting (A) an unsaturated precursor copolymer of at least one conjugated diene and at least one monovinylarene characterized by a number average molecular weight of at least about 5,000, a residual olefinic unsaturation of at least about 5 mol percent, and about 5:95 to 95:5 weight percent copolymerized conjugated diene:monovinylarene, with (B) at least one dihydrocarbyl azodicarboxylate under reaction conditions employing amounts of dihydrocarbyl azodicarboxylate effective to improve at least one of the characteristics of oil swell resistance and wet skid resistance in a cured state of said precursor copolymer, thereby producing a gel free modified copolymer, and
curing said modified copolymer.

25. The cured modified copolymer of claim 24 wherein said conjugated diene is butadiene, said monovinylarene is styrene, the precursor polymer is a random or linear teleblock copolymer, and the dihydrocarbyl azodicarboxylate is diethyl or di-t-butyl azodicarboxylate.

26. A gel free oil-resistance bicarbamate modified rubbery conjugated diene/monovinylarene copolymer prepared by reaction of an unsaturated conjugated diene/monovinylarene precursor copolymer with a dihydrocarbyl azodicarboxylate corresponding to the formula:

wherein R' and R" each are selected from alkyl, cycloalkyl, aryl, or combination hydrocarbon radicals, such that each of said R' and R" contains 1 to 12 carbon atoms per radical, employing about 50 to 500 millimoles per 100 grams of precursor copolymer.

27. A gel free modified copolymer prepared by the process which comprises:
contacting (A) an unsaturated precursor copolymer of at least one conjugated diene and at least one monovinylarene, wherein said precursor copolymer is characterized by a number average molecular weight of at least about 5,000, residual olefinic unsaturation of at least about 5 ml percent, and contains about 5:95 to 95:5 weight percent copolymerized conjugated diene:monovinylarene, with (B) at least one said dihydrocarbyl azodicarboxylate corresponding to the formula:

wherein R' and R" each are selected from alkyl, cycloalkyl, aryl, or combination hydrocarbon radicals, such that each of said R' and R" contains 1 to 12 carbon atoms per radical, under reaction conditions employing about 50 to 500 millimoles dihydrocarbyl azodicarboxylate per 100 grams precursor copolymer effective to improve at least one of the characteristics of oil swell and wet skid resistance in a cured state relative to the said precursor copolymer.

28. The copolymer according to claim 27 wherein said conjugated diene is selected from the group consisting of 1,3-butadiene, isoprene, 2,3-dimethyl-1,3-butadiene, piperylene, 3-butyl-1,3-octadiene, 2-phenyl-1,3-butadiene, or mixture; and wherein said monovinylarene monomer incorporated into said precursor copolymer is selected from the group consisting of styrene, alpha-methylstyrene, 3-methylstyrene, 4-n-propylstyrene, 4-cyclohexylstyrene, 4-dodecylstyrene, 2-ethyl-4-benzylstyrene, 4-p-tolylstyrene, 4-(4-phenyl-n-butyl)styrene, 1-vinyl-naphthalene, or mixture.

29. The copolymer according to claim 28 wherein said weight percent is in the range of about 55:45 to 85:15.

30. The copolymer according to claim 29 wherein said precursor copolymer exhibits a number average molecular weight of about 40,000 to 250,000.

31. The copolymer according to claim 30 wherein said conjugated diene is selected from isoprene and 1,3-butadiene, and said monovinylarene is styrene.

32. The copolymer according to claim 31 wherein said dihydrocarbyl azodicarboxylates are selected from the group consisting of: di-t-butyl azodicarboxylate and diethyl azodicarboxylate.

33. The copolymer according to claim 3 wherein said precursor copolymer is a butadiene/styrene copolymer.

34. The copolymer according to claim 33 wherein said precursor copolymer is a 75/25 butadiene/styrene random radial copolymer.

35. The copolymer according to claim 33 wherein said precursor copolymer is linear butadiene/styrene teleblock rubbery copolymer of about a 60:40 butadiene/styrene ratio.

* * * * *